(12) United States Patent
Kastalsky

(10) Patent No.: US 7,158,278 B2
(45) Date of Patent: Jan. 2, 2007

(54) DISPLAY DEVICE BASED ON BISTABLE ELECTROSTATIC SHUTTER

(75) Inventor: Alexander Kastalsky, 3 Kenneth Dr., Wayside, NJ (US) 07712

(73) Assignee: Alexander Kastalsky, Wayside, NJ (US)

(*) Notice: Subject to any disclaimer, the term of this patent is extended or adjusted under 35 U.S.C. 154(b) by 307 days.

(21) Appl. No.: 10/822,830

(22) Filed: Apr. 12, 2004

(65) Prior Publication Data

US 2005/0225827 A1 Oct. 13, 2005

(51) Int. Cl.
G02B 26/00 (2006.01)
G09G 3/34 (2006.01)

(52) U.S. Cl. .............. 359/290; 359/292; 359/295; 359/298; 359/224; 359/223; 345/84; 345/108; 345/109

(58) Field of Classification Search ............... 359/223, 359/224, 290–295, 298; 345/85, 108, 109
See application file for complete search history.

(56) References Cited

U.S. PATENT DOCUMENTS

| | | | | |
|---|---|---|---|---|
| 5,867,297 A * | 2/1999 | Kiang et al. | ................ | 359/223 |
| 5,960,132 A * | 9/1999 | Lin | ............... | 385/18 |
| 6,215,222 B1 * | 4/2001 | Hoen | .......... | 310/309 |
| 6,396,975 B1 * | 5/2002 | Wood et al. | ................. | 385/18 |
| 6,532,093 B1 * | 3/2003 | Sun et al. | ................ | 359/198 |
| 6,556,741 B1 * | 4/2003 | Fan | ................ | 385/18 |
| 6,606,428 B1 * | 8/2003 | Goldstein et al. | .......... | 359/223 |
| 6,639,572 B1 * | 10/2003 | Little et al. | ................ | 345/108 |
| 6,757,093 B1 * | 6/2004 | Wood et al. | ................ | 359/291 |
| 6,788,520 B1 * | 9/2004 | Behin et al. | ............... | 361/207 |
| 6,847,152 B1 * | 1/2005 | Miller et al. | ............... | 359/224 |

* cited by examiner

Primary Examiner—Evelyn A. Lester (57) ABSTRACT

Electromechanical shutter and display comprising a two-dimensional matrix of such shutters are proposed, in which the membrane under the force of electrostatic attraction moves from its original position parallel to the substrate plane into a final position normal to the substrate plane, thereby transferring the shutter, or display pixel, from its "off" state into its "on" state. To produce the "on" state, the electrostatic force is applied only to a narrow conductive strip placed on the side of the membrane and rotates the membrane around the torsion hinges attached to this strip. Two-and three-electrode shutter and pixel configurations are considered. Both versions provide a bi-stable membrane behavior, which implies that the voltage needed to transfer the membrane into the "on" state is larger than the voltage needed to maintain the membrane in this state. This feature of bi-stability allows realization of functions "pixel hold" and "pixel select" using a simple passive matrix architecture. In the "pixel hold" state, after forming image on the screen, the display consumes essentially no power. The "on"-to-"off" contrast ratio is expected to be high. These properties are very attractive for utilization of this display for electronic book application.

26 Claims, 8 Drawing Sheets

DISPLAY DEVICE BASED ON BISTABLE ELECTROSTATIC SHUTTER

FIELD OF THE INVENTION

The present invention relates to the bi-stable electrostatic optical shutter, and more particularly, to the flat panel display containing a two-dimensional array of these shutters.

BACKGROUND OF THE INVENTION

The electrostatic optical modulator employing a resilient electrode moving over a static electrode has been a subject of multiple patents and publications. The difference between these modulators originates essentially from the shape of electrodes involved as well as the direction and spatial limitations of movement of the flexible electrode relative to the static electrode, see e.g. U.S. Pat. Nos. 4,229,075; 4,208,103 and 4,786,149. Lateral membrane movement is used in optical shutter and display of U.S. Pat. No. 6,288,824, wherein the electrostatically moved membrane and static electrode consist of periodic metal stripes, so that lateral membrane movement opens or closes multiple slits to pass or shut the light. Another approach, see U.S. Pat. No. 6,600,474, relies on a flipping of the membrane by 180 degrees, and latching it at this position by an electrostatic force. No resilient force is applied, since the membrane freely turns around the hinges between two extreme positions.

Various examples of the electrostatic optical modulators are based on the field induced bending of a cantilever membrane which is moved toward a flat static electrode, thereby changing the optical state, see U.S. Pat. Nos. 3,553,364; 3,600,798; 4,229,732; 4,731,670 and 5,781,331. Another approach relies on an electrostatically induced twisting of the membrane mirror from its initial flat position to vary the optical reflection, see U.S. Pat. Nos. 3,746,911 and 4,710,732. This electrostatic optical modulator, known as Deformable Mirror Device (DMD), is currently commercially used in a projection display.

The DMD pixels represent a densely packed mirror array reflecting light beams into the objective lens when the pixels are unbiased ("on state") and moving the reflected light out of the objective lens when they are electrostatically tilted ~10 degrees ("off state"). The limitations of application of the DMD strictly to projection display originates from the small tilt of the twisted membrane, since 10 degree rotation is not enough to use the DMD pixels for the flat panel displays.

In the proposed shutter and display, according to the present invention, this limitation is lifted due to different pixel design which allows for membrane tilt of 90 degrees, thereby making it suitable for application to the flat panel displays.

OBJECT AND SUMMARY OF THE INVENTION

It is an object of the present invention to introduce new electromechanical optical shutter based on a large membrane rotation under the electric field.

Another object of the present invention is to introduce a new flat panel display in which these shutters compose an electrically controlled two-dimensional array of pixels.

Yet another object of the present invention is to provide the detailed description of the operation, fabrication and performance of the proposed flat panel display.

According to the present invention, the shutter comprises a membrane disposed over and separated from the substrate by an air gap. The membrane is held parallel to the substrate by four pillars grown on the substrate. Two pillars support the membrane through conductive hinges attached to the membrane, while two other pillars support the membrane at its opposite side. The pillar height controls the air gap space.

The membrane consists of several layers:
the bottom conductive layer connected to the hinges;
the insulator above the bottom conductive layer;
and the top layer having high optical reflectivity in one shutter embodiment and black light absorbing surface in another, see below.

The top layer is isolated form the bottom conductive layer on the membrane and does not participate in the process of electrical activation of the shutter. The bottom conductive layer, made as a conductive stripe, about 3–4 µm wide, and connected to the membrane supporting hinges, occupies a small portion of the membrane and serves as one of the electrodes for electric field induced membrane movement. This layer is shifted to on one of the sides of the membrane and thus positions the membrane asymmetrically relative to the membrane supporting hinges.

The second controlling electrode is made in the shape of a narrow metal stripe and placed on the substrate underneath and parallel to the bottom conductive layer of the membrane. When a potential difference is applied between the bottom conductive layer on the membrane and the second electrode on the substrate, the electrostatic force rotates the membrane to reduce the distance between the active electrodes. If the air gap is deep enough to accommodate the width of the bottom conducting layer, the twisted membrane can reach the position normal to the substrate plane, and thereby fully open the shutter to pass the light or drastically change the shutter reflection. Thus, unlike the previously discussed DMD, having small rotation angle for the membrane, the proposed shutter allows large shutter opening and therefore can be used for fabrication of the flat panel display.

It is important that membrane final position relative to the substrate can be maintained by a controlling voltage which is lower than the voltage needed to turn the membrane into its upright position. Such a bi-stability effect exists due to increase of the capacitance between the active electrodes, as the membrane electrode approaches the electrode on the substrate. As discussed below, in the process of membrane lifting from its original position, the membrane enters the region of instability and snaps into the final state corresponding to the fully opened shutter. This state can be maintained indefinitely long by a relatively small voltage in comparison with the original voltage required to transfer the membrane into this fully opened position.

A two-dimensional array of these shutters, with the appropriate network of connecting lines, forms a display matrix, wherein each shutter with associated connection lines forms an elemental display pixel. As discussed below, the bi-stability feature is helpful to simplify the display driving scheme. The proposed mechanism of optical modulation results in two different display implementation, namely, as a light reflective display, or as a light transmissive display. In the latter case, a back light is needed to create an image on the screen.

The display fabrication relies on the well known Micro-Electro-Mechanical System (MEMS) technology, when the membranes or cantilevers are made with selective etching of sacrificial layers deposited during a multi-layer fabrication process. The flexible films of metals and insulators (or their combination) remaining in the structure after removal of the sacrificial layers, are known to posses extreme mechanical strength, flexibility and long life time of operation.

The primary use for the proposed display would be the electronic book, when the text remains on the screen for a long time. There are several advantages for this particular application:

1. The display practically consumes no power, since there is no current in the pixels, an important condition for the e-book operation. This implies that only reflective display mode will be useful for this application.
2. Once the image appears on the screen, typically as a black text on a white background, it is then maintained indefinitely by constant voltages applied to the columns and rows. No image scanning, gray levels or moving picture are required in this case. This implies that during the exposure of a page on the screen, each membrane will be locked at its extreme fully "on" of fully "off" positions until the page is changed.
3. Due to the bi-stability effect, pixel selection does not require an active matrix network and can be done in a passive mode through direct activation of appropriate rows and columns.
4. The useful area in the pixel is large, and the fill factor can be made within 95%. This implies a good white color of the electronic "paper", if the pixel in its "off" state reflects the light from the top layer. High fill factor also indicates a good black color for the image, when the membrane is twisted to its "on"-state position. The exposed area underneath the membrane is coated with the black powder to maximize the on/off contrast ratio.
5. Since the image on the screen is maintained for a long time, there is a little wear of the twisted parts, which warrants a long life time.

The pixel design of the proposed display is simple, and its fabrication is well within planar, MEMS-based technology. Only four photolithography masks are required for the fabrication (see below). This implies low cost for the device production.

BRIEF DESCRIPTION OF THE DRAWINGS

FIG. 7. a. Structure of the active electrode on the substrate for three-electrode pixel design.
b. Matrix of pixels for three-electrode pixel design.

DETAILED DESCRIPTION

Figure 1:
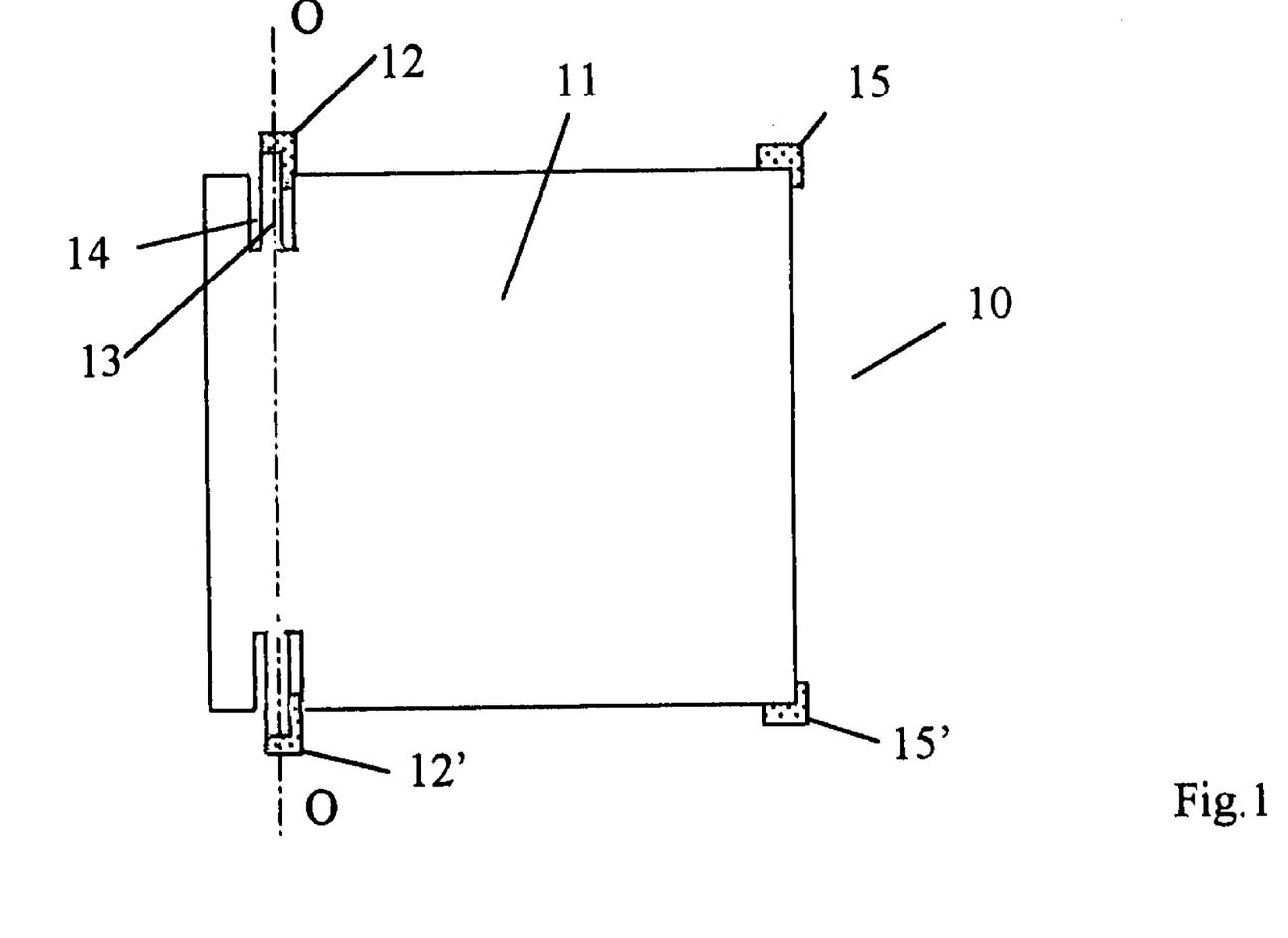
FIG. 1. Top view of the electromechanical shutter.

FIG. 1 shows the top view of the shutter 10. The square shape membrane 11 rests on four pillars 12, 12', 15 and 15' grown on the substrate (not shown). Two stripes 13, made by cutting notches 14 in the membrane 11, attach the membrane to the pillars 12 and 12' and provide electrical connections to the external voltage source. At the same time, the stripes 13 serve as torsion hinges for membrane rotation around the axis OO under the electrostatic forces (see below).

The torsion hinges are shifted to the left side of the membrane, ~3–4 μm away from the left edge of the membrane. Therefore, the membrane rotation lifts the largest, right portion of the membrane, while a small membrane area on the left side from the hinges will be depressed toward the substrate. The stripes 13 have an appropriate length to provide a resilient force for the membrane twist around the hinges: they should be long enough to minimize the electrostatic force and therefore, external voltage for the membrane rotation, yet sufficiently strong for quick membrane return to its original flat position when the voltage is switched off.

Depending on the shutter design and application, there are several options for coating the top membrane surface. In the case, when the shutter is used as a light reflective modulator, it is preferable to coat the top surface with light reflecting material, such as layer of Al, or white paint or powder, while the deeper part of the shutter underneath the membrane (not shown) is blackened to increase the on-off contrast ratio. The alternative embodiment would be coating top membrane surface with a black paint/powder and coating the substrate area underneath the membrane with white paint/powder. In the first case, the unbiased, "on"-state, of the shutter has white color, while in the second case it has black color. In another, transmissive, mode of operation, when the shutter modulates the back light passing through the device, it is preferable to blacken the top membrane surface.

The active membrane area, participating in the light modulation is large and provides the shutter fill factor close to one. Only the notches 14 and partially the stripes 13 do not contribute to the light modulation.

Figure 2:
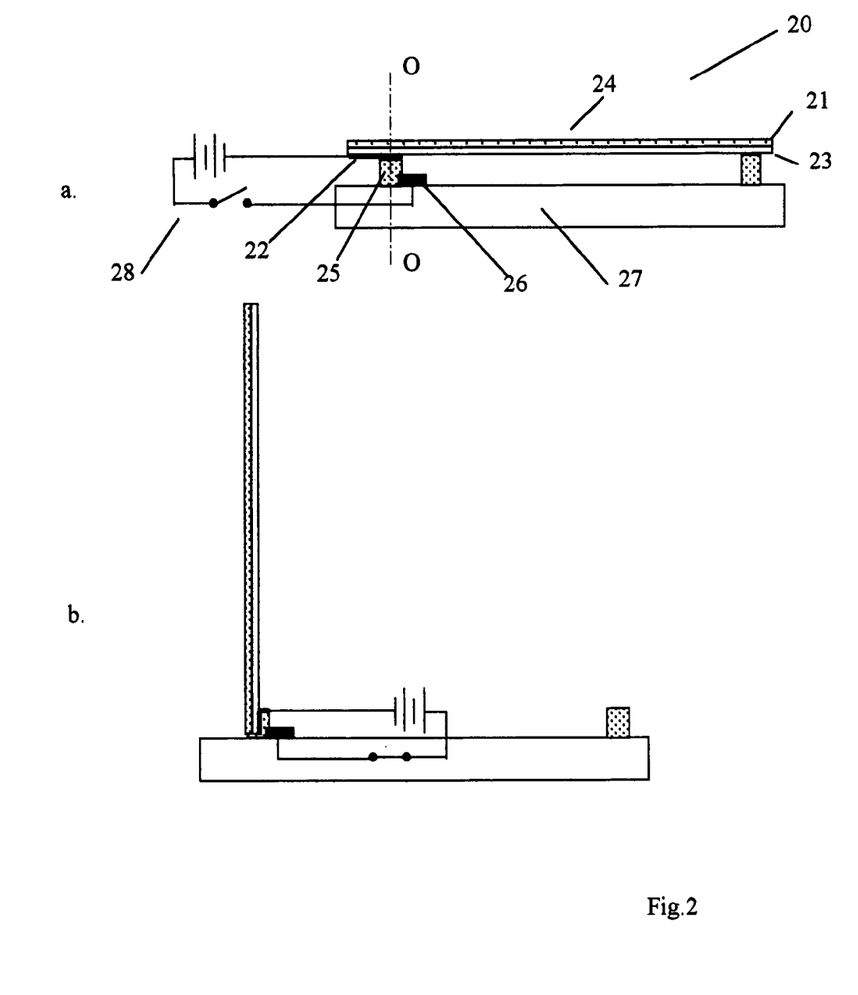
FIG. 2. Cross-sectional view of the shutter in:
a. unbiased state ("off"-state)
b. electrically biased state ("on"-state).

FIG. 2 shows a cross-sectional view of the shutter 20 in unbiased (a) and biased (b) state. The membrane 21 consists of three layers: the bottom conductive layer 22, the insulating layer 23 and the top layer 24. The latter, depending on the shutter design, can be made as light reflecting layer or black color film. In the case, when the shutter operates in the light reflecting mode, it is preferable to make the top layer as a white color reflecting film, and a highly reflective metal, such as Al, is the most appropriate material for this layer.

The top film 24 is not electrically connected to the membrane driving circuit, while small, 3–4 μm wide, stripe 22 of the bottom conductive layer serves as one of the electrodes for the membrane activation. This stripe extends to the pillars 25 to which the power supply 28 is attached.

The second electrode of the driving circuit is deposited as a narrow metal stripe 26 on the substrate 27. This stripe extends parallel to the stripe 22 of the membrane 21 (i.e. normal to the plane of the drawing) in close proximity to the pillars 25 and is connected to the power supply 28. The detailed view of the layer 26 will be shown later in reference to FIG. 3.

When the power supply 28 is disconnected, FIG. 2a, the membrane 21 rests on the pillars 25 and thus constitutes "off"-state of the shutter. As the voltage is applied between the electrodes 22 and 26, the electrodes acquire an electrostatic force of attraction. At an appropriate bias, electrode 22 on the membrane starts moving toward the electrode 26 on the substrate, thereby lifting up the right (largest) part of the membrane. The height of the pillars 25 is made slightly higher than the width of the strip 22, so that the membrane can move to its final, "on-"state position of the shutter, which corresponds to the membrane plane normal to the substrate plane, FIG. 2b. The shutter is then fully open, and capable of transmitting light, if the substrate 27 is made from a transparent material, such as glass, while the top membrane surface is coated with a black powder to enhance the "on"-to-"of" contrast ratio. On the other hand, when the reflective mode of the shutter operation is chosen, the substrate underneath the membrane is blackened, so that in the "on"-state the shutter absorbs the light, while in the "off"-state the metal on top of the membrane reflects the light. Another possible embodiment of the reflective display includes coating the top membrane surface with a white paint or powder. No metal deposition on top of the membrane is needed in this case. The third version of the reflective display, can be implemented by making the "off"-state black by depositing black powder on top of the display, while the "on"-state corresponds to the white color. White or light reflecting dielectric paint or powder deposited on the substrate prior to the membrane fabrication is preferred method of making white color. It is important that the reflective mode is best suitable for the e-book applications, since no backlight is required for operation in this case, and therefore, no power is consumed.

Figure 3:
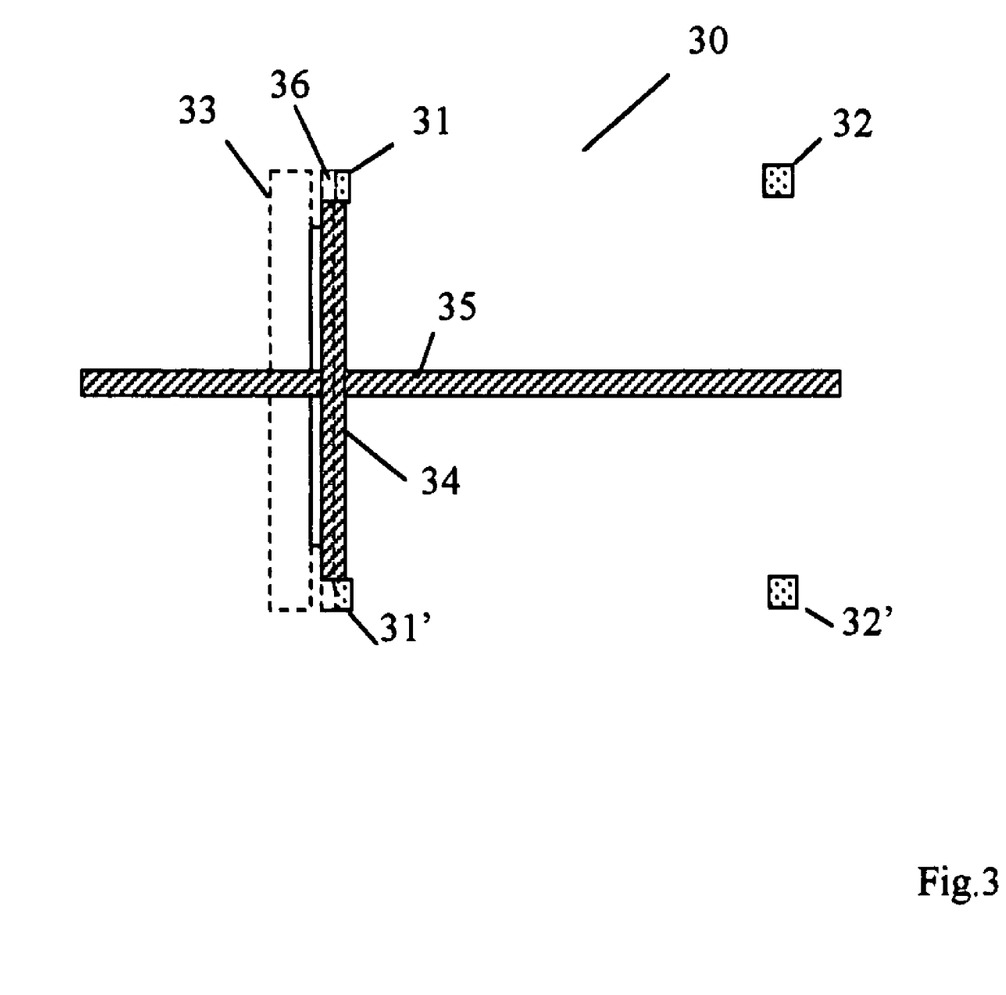
FIG. 3. Structure of the active electrode on the substrate for two-electrode pixel design.

FIG. 3 shows the top view of the shutter underneath the membrane. Four pillars grown on the substrate support the shutter. The first two pillars, 31 and 31', serve for both the support of the membrane and the electrical connection of the active electrode 33 through torsion hinges 36 located on the membrane (dashed line). Two other pillars, 32 and 32', are used only for the membrane support.

The metal stripe 34 represents the second active electrode of the driving circuit. It is placed on the substrate parallel to and underneath the active electrode 33 on the membrane. The electrical access to this electrode is accomplished by connecting it to the horizontal conductive line 35. This line serves as a row line in the display matrix, while connections of the membrane electrode 33 through the torsion hinges 36 and pillars 31 and 31' form a vertical, column line of the matrix network, see below. To avoid direct electrical contact of the active electrodes 33 and 34 when the membrane is in the vertical position ("on"-state), the electrode 34 and the conducting line 35 are coated with an insulating film of thickness t. In the calculations below, this film is assumed to be the smallest distance d between the active electrodes, d=t, when the membrane is moved to its upright position.

At some moment of the membrane movement under the electrostatic force, the membrane enters the region of instability. The instability is caused by super-linear increase of the force of electrostatic attraction and decrease of the membrane weight as the membrane moves toward its final, vertical position, see below. This feature results in the membrane bi-stability, implying that fully "on"-state can be supported by a voltage, lower than the voltage needed to move the membrane into this state.

Figure 4:
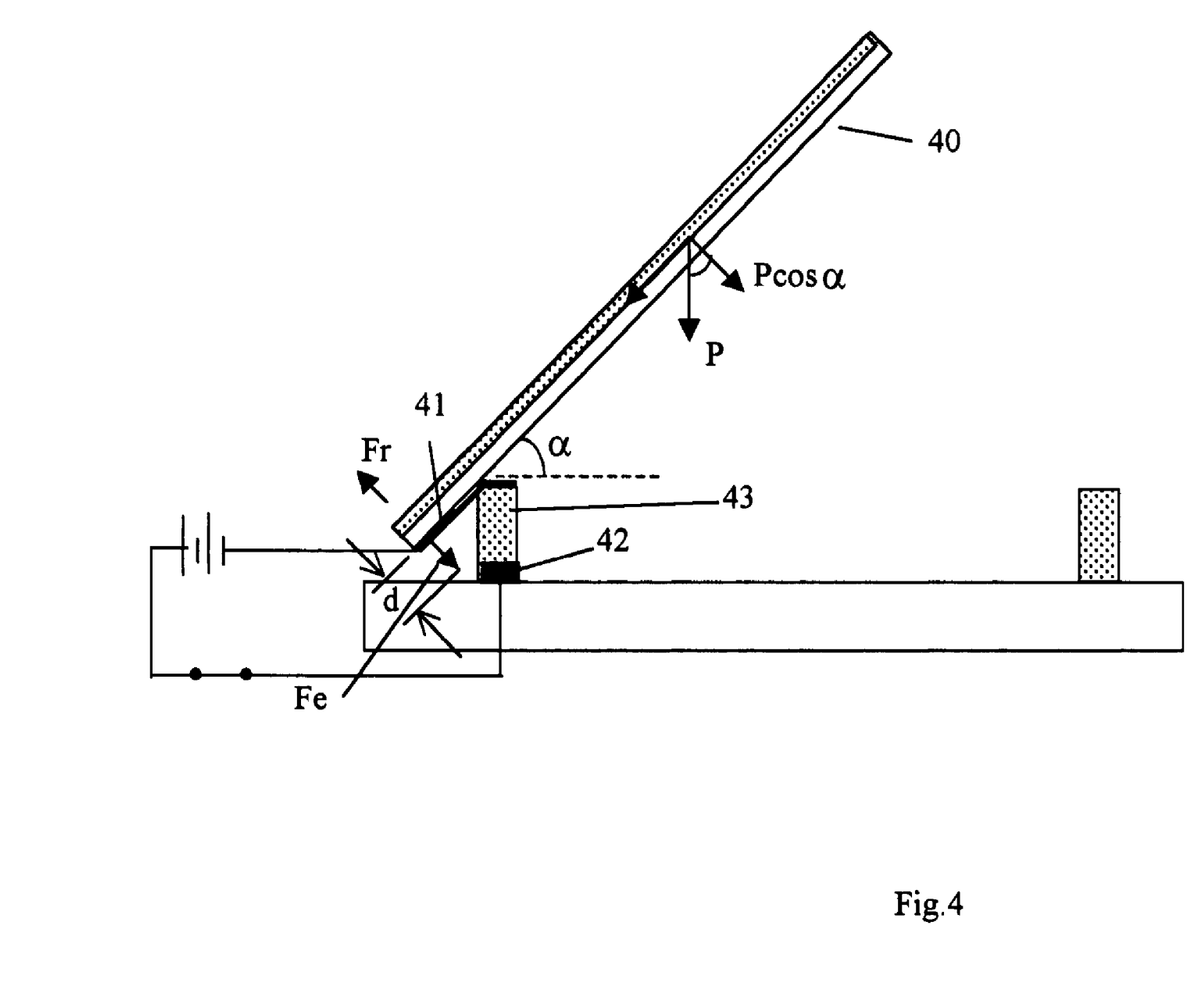
FIG. 4. Illustration of forces applied to the membrane.

The forces applied to the membrane 40 are shown in FIG. 4. Three forces are taken into account: the electrostatic force of electrode attraction, the membrane weight and the resilient force of membrane hinges. For the sake of estimates, all formulas were simplified and used only for demonstration of the effect of bi-stability. The electrostatic force $F_e$ lifting the membrane is $$F_e = SV^2/2d^2,$$

where S is the area of the stripe 41, V the voltage applied, and d the distance between the active electrodes 41 and 42. Distance d varies from d≈l (l is the height of the pillar 43), when the membrane lies on the pillars, to a very small value, determined essentially by the insulation thickness t between the active electrodes 41 and 42, d=t, when the membrane is twisted to its extreme position normal to the substrate plane.

The membrane resilient force is $$F_r = \gamma \cdot \alpha,$$

where $\gamma$ is the elasticity coefficient of the torsion belts and $\alpha$ is the angle of the membrane tilt from its original state. This force depends on the design and geometry of the torsion hinges. One can change the length and width of the supporting belts, their thickness and fabrication materials, and thus vary the coefficient $\gamma$ in a wide range to adjust the resilient force for obtaining the effect of bi-stability.

The membrane weight is $P_m$=mg, where m is the membrane mass. The force acting on the membrane is the weight component in the direction normal to the membrane plane $P_{mn}$, which is tilted by the angle $\alpha$ from its original position, is $$P_{mn} = P_m \cdot \cos\alpha = P_{mn} \cdot d/l.$$

In the equilibrium, the torques (momenta of forces) acting on the membrane lever are equal:

$$(F_e - F_r) \cdot l = P_{mn} \cdot L$$

where L is the membrane length. As the membrane moves up, the distance d decreases, and all three forces begin to change: $F_e$ increases super-linearly $\sim 1/d^2$, $P_{mn}$ decreases linearly $\sim d$ and $F_r$ increases proportionally to angle $\alpha$. At some tilting angle $\alpha$, the super-linear increase of $F_e$, and the decrease of the weight component $P_{mn}$, cannot be compensated by the linear increase of the resilient force $F_r$, and the system snaps into final extreme position at d=t and $\alpha=\pi/2$.

One can estimate the voltages needed to keep the membrane in the above discussed two extreme positions. In the original, "off"-state, d=l and $\alpha$=0. In this case, equating the torques applied to the membrane lever from the left side (electrostatic force) and from the right side (membrane weight) one obtains:

$$1 \cdot F_e = (L-1) \cdot mg,$$

where L is the total membrane length. This equation defines the voltage $V_{lift}$ needed for lifting the membrane. At reasonable values of L=200 μm, l=4 μm, and for SiO$_2$-based, 0.5 μm-thick membrane, one obtains $V_{lift} \sim 1V$.

In the final, vertical, membrane position, $P_{mn}$=0, d=t, and $$F_e = SV^2/2t^2 = \gamma \cdot \pi/2.$$

In this case, minimum voltage needed to hold the membrane in the vertical position, $V=V_{on}=(\gamma \pi t^2/S)^{1/2}$. Since t<<1, at a reasonable value of $\gamma$ one can easily obtain $V_{on}$ much less than the voltage $V_{snap}$ needed to transfer the membrane into the final "on"-state. Therefore, the "on"-state of the shutter can be maintained by a voltage, significantly lower than the voltage needed to transfer the membrane into this state. This implies that after application of a relatively high pulsed voltage $V=V_{snap}$ and transferring the membrane into the final "on"-state, this state can be supported indefinitely by a small constant voltage $V_{on}$. At the same time, the voltage $V_{on}$ will practically not affect the pixel in the "off"-state, since the electrostatic force needed to produce the "on"-state $F_{e,snap} \sim V_{snap}^2$ is much greater than the supporting force $F_{e,on} \sim V_{on}^2$. This is important factor for simplifying the driving architecture of the display, composed of a two-dimensional matrix of these shutters, see below.

The display, according to the present invention, consists of a two-dimensional array of the above described shutters, wherein each shutter, together with the associated electrical connections, represents a pixel element. To control the pixels in the display matrix and thus create an image on the screen, the pixels in the matrix must be appropriately connected, and column and row voltages are to be applied.

Figure 5:
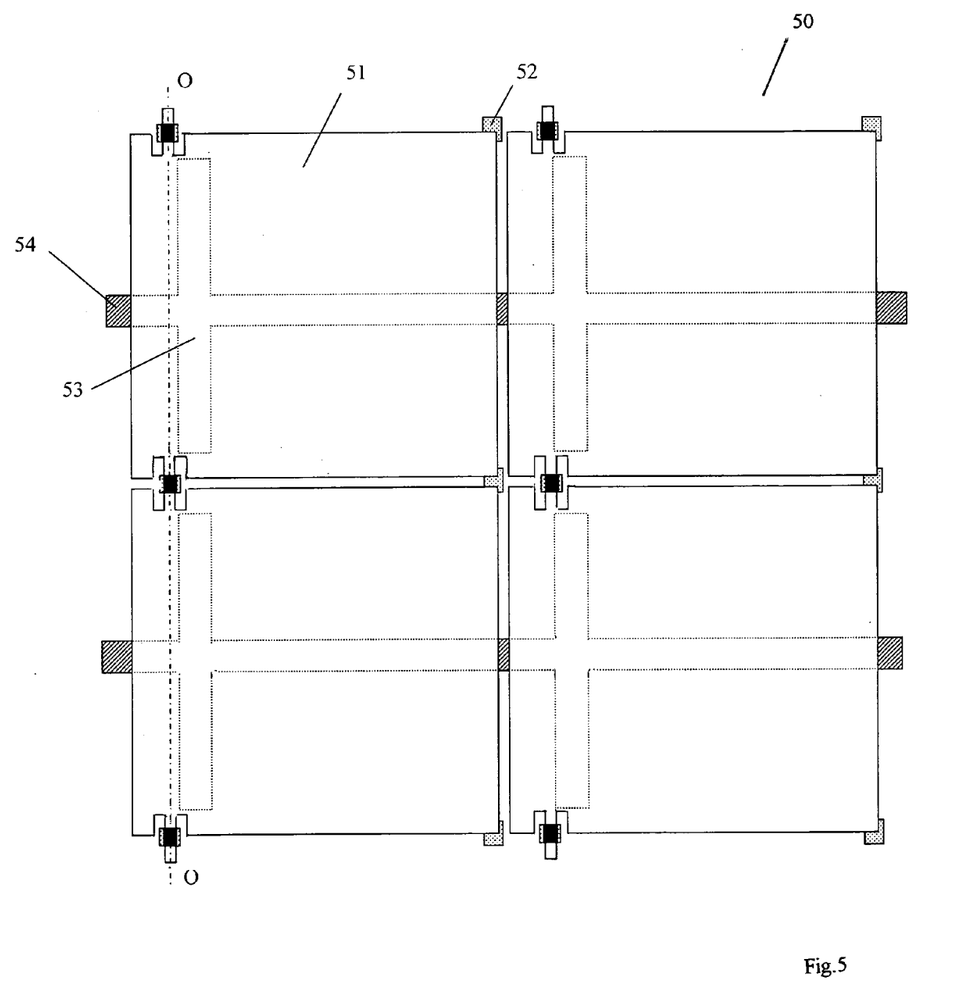
FIG. 5. Top view of four pixels of the display.

One of the exemplary embodiments of the display matrix is illustrated in FIG. 5. Four pixels of the matrix 50 in the "off"-state are shown. The membranes 51 rest on the pillars 52. The membrane active electrodes (not shown) located at the membrane bottom, as shown in FIG. 2 and FIG. 3, are connected through their torsion hinges along axis OO and thus form column lines of the display. All substrate active electrodes 53, shown with dashed line, are connected in each horizontal pixel array to the metal line 54, and thus form row lines of the display. The intersection of row and column line identifies the pixel location.

The pixel is transferred into "on"-state as the associated column voltage exceeds the switching voltage $V_{snap}$, while the associated row line is grounded. After switching the pixel into the "on"-state, this state can be maintained by lower column voltage $V=V_{on}$. Line-by-line sequential enabling of the rows with appropriate activation of the columns, creates a "still" image on the screen. The image will be maintained as long as the potential difference between the column and row lines remains $V_{on}$.

Figure 6:
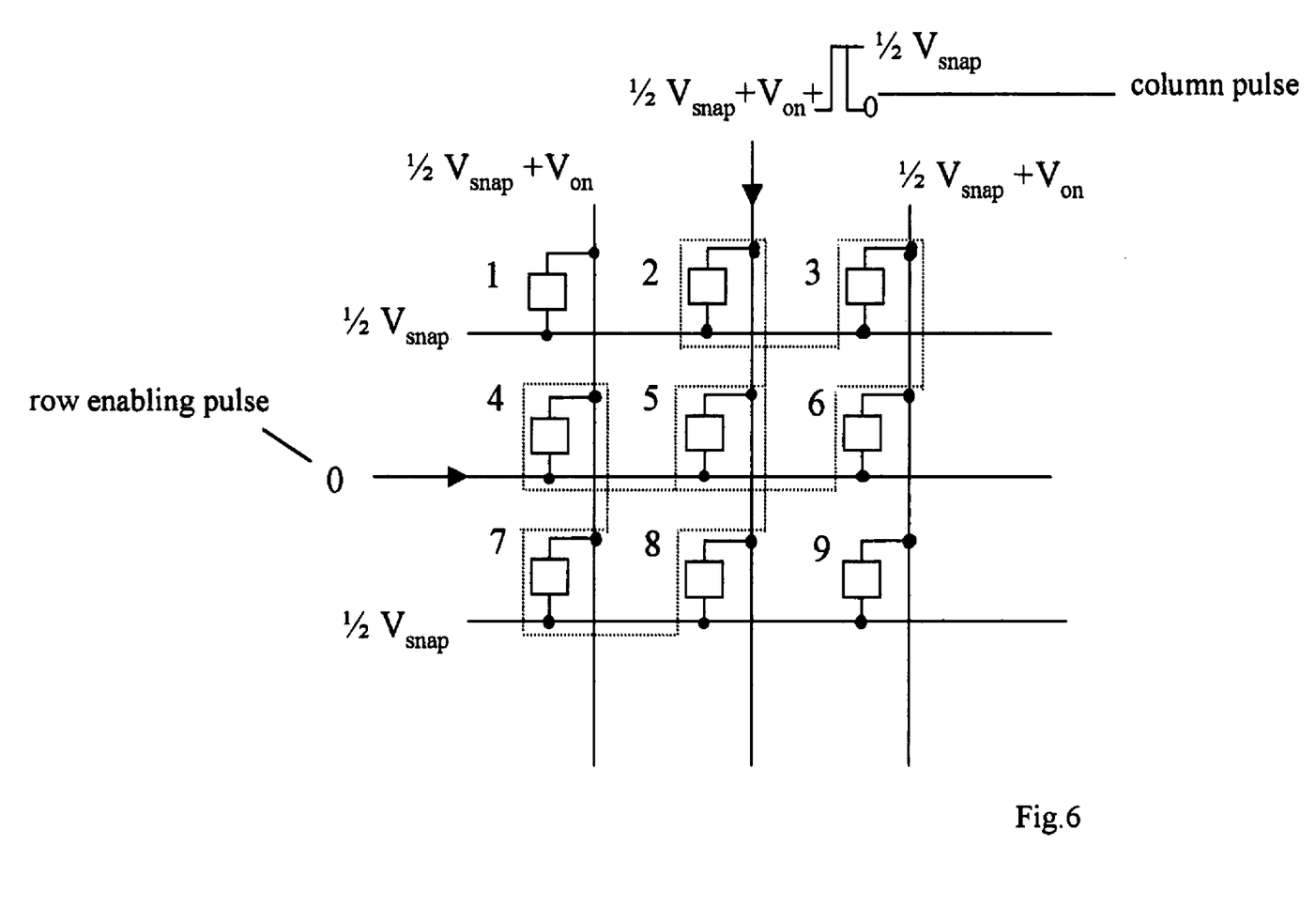
FIG. 6. Matrix of pixels for two-electrode pixel structure.

FIG. 6 illustrates exemplary approach in the display charging procedure, allowing one to obtain the above mentioned "still" image, suitable for the e-book application. Nine pixels in the matrix are shown as square boxes connected to the row and column lines. In the original "off" state, all rows have the voltage $\frac{1}{2}V_{snap}$ while all the columns have the voltage $\frac{1}{2}V_{snap}+V_{on}$, so that the resultant voltage drop across each pixel is $V_{on}$. Pixel 5 is charged by applying additional data pulse of amplitude $\frac{1}{2}V_{snap}$ to the middle column line and simultaneous enabling the middle row line by grounding it. The resultant voltage across this pixel becomes $V_{snap}+V_{on}$, which is sufficient to switch the pixel into the "on"-state. All other pixels in the 9 pixel matrix have the voltage drop $V_{on}$ (across pixels 1,3,7 and 9) or $\frac{1}{2}V_{snap}+V_{on}<V_{snap}$ (across pixels 2,4,6 and 8) and therefore will remain in their "off"-state. After sequential enabling of all rows in the display and thus creating the image, all pixels obtain their original voltage drop of $V_{on}$, which will keep the image on the screen indefinitely long.

The above discussed two-electrode pixel driving scheme may have some problem for its realization in a real device. More detailed analysis of the pixel matrix of FIG. 6 shows presence of multiple pixel connections across the entire network. Al pixels are connected to each other through additional circuit loops, having at least four pixels in each loop. Dotted lines in FIG. 6 show two examples of such loops: pixels 4,5,7 and 8 form the first loop, while pixels 2,3,5 and 6 form the second loop, with pixel 5 involved in both of them. This implies a cross-talk between the pixels and additional voltage drops across the pixels in the process of initial pixel charging to create an image on the screen. As a result, during the pulsed charging process of the pixel 5, as shown in FIG. 6, pixels 4 and 6 acquire additional voltage equal to $\frac{1}{3}$ of the pulsed voltage $\frac{1}{2}V_{snap}$, thereby yielding the total voltage on these two pixels of $\frac{1}{2}V_{snap}+\frac{1}{6}V_{snap}+V_{on}=\frac{2}{3}V_{snap}+V_{on}$. Other six pixels in the matrix acquire at this moment a total voltage drop of $\frac{1}{6}V_{snap}+V_{on}$. Although the voltage on the pixels 4 and 6 of $\frac{2}{3}V_{snap}+V_{on}$ is lower than $V_{snap}$ required for switching the pixel into the "on"-state, such a small difference between these two voltage amplitudes may cause a pixel malfunctioning, when pixel properties are not absolutely identical, and pixel-to-pixel variations of $V_{snap}$ may occur, for instance, due to spatial variations of the resilient force.

Figure 7:
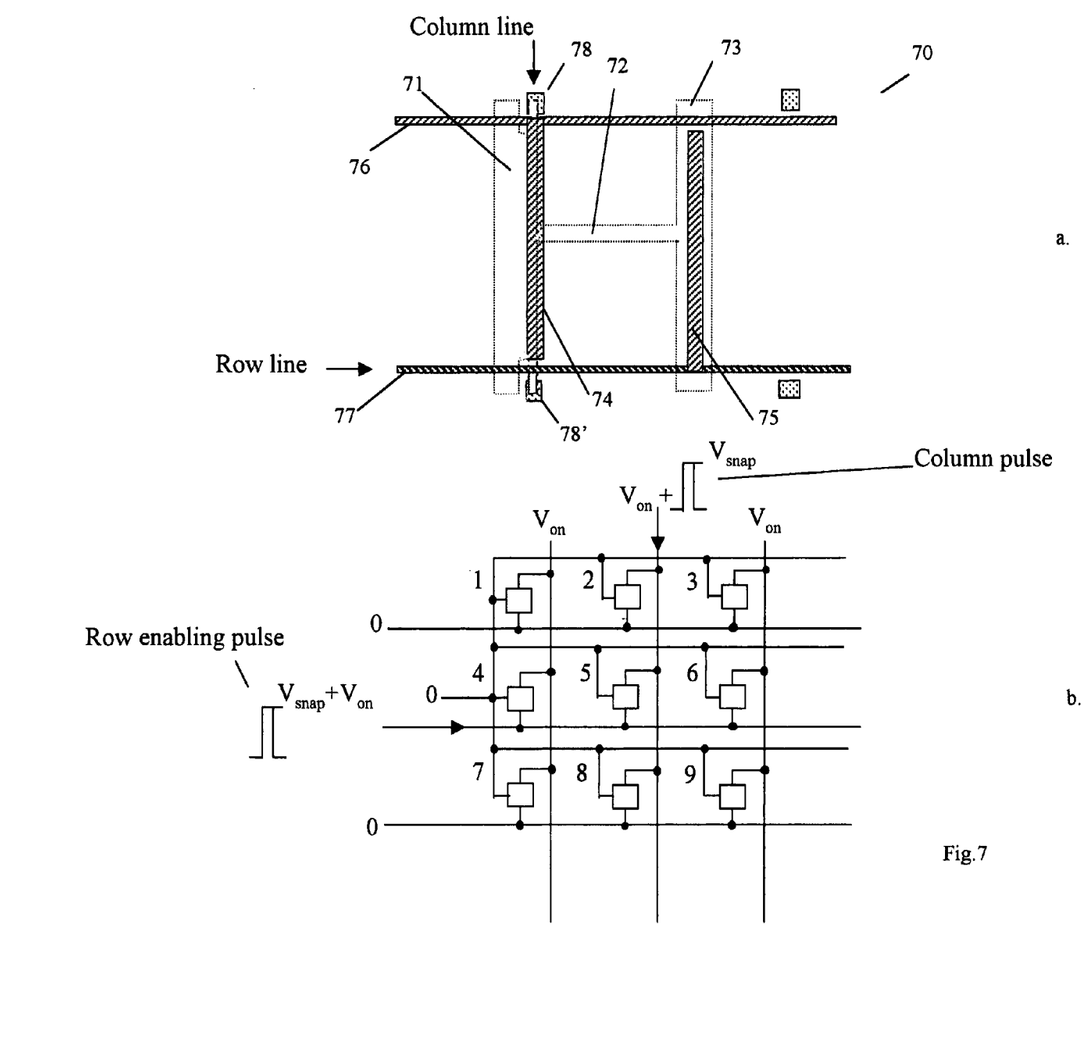

To avoid complications related to the above discussed cross talk another, three-electrode, pixel design can be employed. In this case, any additional potential drops across the pixels do not affect the display performance. Exemplary three-electrode pixel structure is shown in FIG. 7a. The structure of the substrate active electrodes underneath the membrane is seen, together with the active electrode located on the membrane (dotted line). The latter consists of three elements: two vertical conductive stripes 71 and 73, 3–4 μm wide, and a horizontal conductive stripe 72 connecting together all three stripes. The electrode 71 is similar to that in the two-electrode structure shown in FIG. 3. The new electrode 73 is placed somewhere in the middle of the membrane.

Unlike the previous, two-electrode, design shown in FIG. 3, there are two independent active electrodes on the substrate, 74 and 75, electrically isolated from each other and connected to two separate conductive lines. The left electrode 74 is similar to that in FIG. 3 and is placed underneath and parallel to the active membrane conductive stripe 71. This electrode is connected to the conductive line 76 and is always grounded for all pixels over the display. The right electrode 75 is located on the substrate underneath and parallel to the conductive stripe 73 on the membrane. The electrode 75 is connected to the row line 77 in every horizontal pixel array. The row lines 77 for different pixel arrays are electrically isolated from each other.

The column line connects the bottom electrodes 71 of the membranes in each vertical pixel array using pillar pads 78 and 78'. Thus, there are two pairs of active electrostatic electrodes in the pixel structure, 71–74 and 73–75, having similar geometry and capacitance. However, their electrostatic torques are very different: the shoulder of the right lever (L/2) is much greater than that of the left lever (d). Therefore, under application of the holding voltage $V_{on}$ to both left electrodes 71–74 and to the right electrodes 73–75, dominating electrostatic force of the right electrodes will hold the membrane in its original, "off"-state. Such a three-electrode pixel structure allows realization of a simple and reliable passive driving architecture for performing function "pixel select" and "pixel hold".

FIG. 7b. illustrates an example of the display matrix with three-electrode pixel structure. Each pixel, shown as a square box, has three output contacts: the electrode on the substrate 75 of FIG. 7a is connected to the row line; the electrode 74 on the substrate is permanently connected through the line 76 to the ground, and the membrane electrodes 71 and 73 are connected together with the connecting stripe 72 and attached to the column line. Nine pixels are presented as a part of the display matrix. All of them originally have the column voltage $V_{on}$, and all rows are grounded thereby forming the "off" state of the screen.

Pixel 5 is activated into the "on"-state by applying corresponding column and row pulses, while all others remain in the "off"-state. To accomplish transfer of the pixel 5 into the "on"-state, the pulse of amplitude $V_{snap}$ is applied to the middle column.

Simultaneously, the row enabling pulse of amplitude $V_{snap}+V_{on}$ is applied to the middle row, thereby nullifying the resultant voltage drop across the electrodes 73–75 of the pixel 5. In this case, the only remaining electrostatic force is the force between the electrodes 71 and 74: the column voltage pulse $V_{snap}$ is applied to the electrode 71, while the counter electrode 74 is always kept at zero potential. The resultant voltage $V_{snap}+V_{on}$ will transfer the pixel 5 into the "on"-state. Other pixels in this row, i.e. pixels 4 and 6, having the initial constant column voltage $V_{on}$, will remain in their original "off"-state, since the row enabling pulse $V_{snap}+V_{on}$ applied to the electrode 75 increases the force holding the pixels in this state.

After transferring the pixel 5 into the "on"-state and removal of the column and row pulses, the pixel 5 will stay in this state under the holding voltage $V_{on}$, since after rotation of the membrane into its upright position the electrostatic force between the electrodes 73 and 75 practically disappears because of a large distance between these electrodes, while the force between the electrodes 71 and 74 reaches its maximum. One can roughly estimate the ratio of the force values between the electrodes 73 and 75 in the "off"- and "on"-states as $\sim(L/1.4\,d)^2 \approx 1.25 \cdot 10^3$ for $L=200\,\mu m$ and $d=4\,\mu m$.

It is important that in the presented three-electrode pixel design all other pixels in the display will not be affected by the cross talk discussed earlier in reference to FIG. 6. Indeed, in the "off"-state, any additional voltages applied to the pixel through the matrix loops (see FIG. 6) will increase the force between the electrodes 73–75 already holding the pixel in the "off"-state. On the other hand, in the "on"-state, the force between the electrodes 73–75 becomes negligible, so that any additional voltages at these electrodes cannot change this state.

As in the case of two-electrode display, different coating options for making transmissive and reflective display versions exist for three-electrode pixel structure. These options are discussed in reference to FIG. 2, and there is no need to repeat them here.

Thus, the proposed two- and three-electrode, bi-stable pixel structures, according to the present invention, provide functions "pixel select" and "pixel hold" using simple passive matrix architecture, in contrast with conventional and rather expensive active matrix driving scheme, where a network of transistors and capacitances is used to execute these functions. Furthermore, "pixel hold" operation, which is by far the longest procedure in the book reading process, in the proposed display does not consume power, which makes the display very attractive for e-book applications. The "pixel-select" operation requires only small high frequency power component, since there is no DC current across the display.

The above analysis shows that three-electrode pixel structure is a preferred embodiment for the proposed display due to more reliable pixel addressing and switching.

Figure 8:
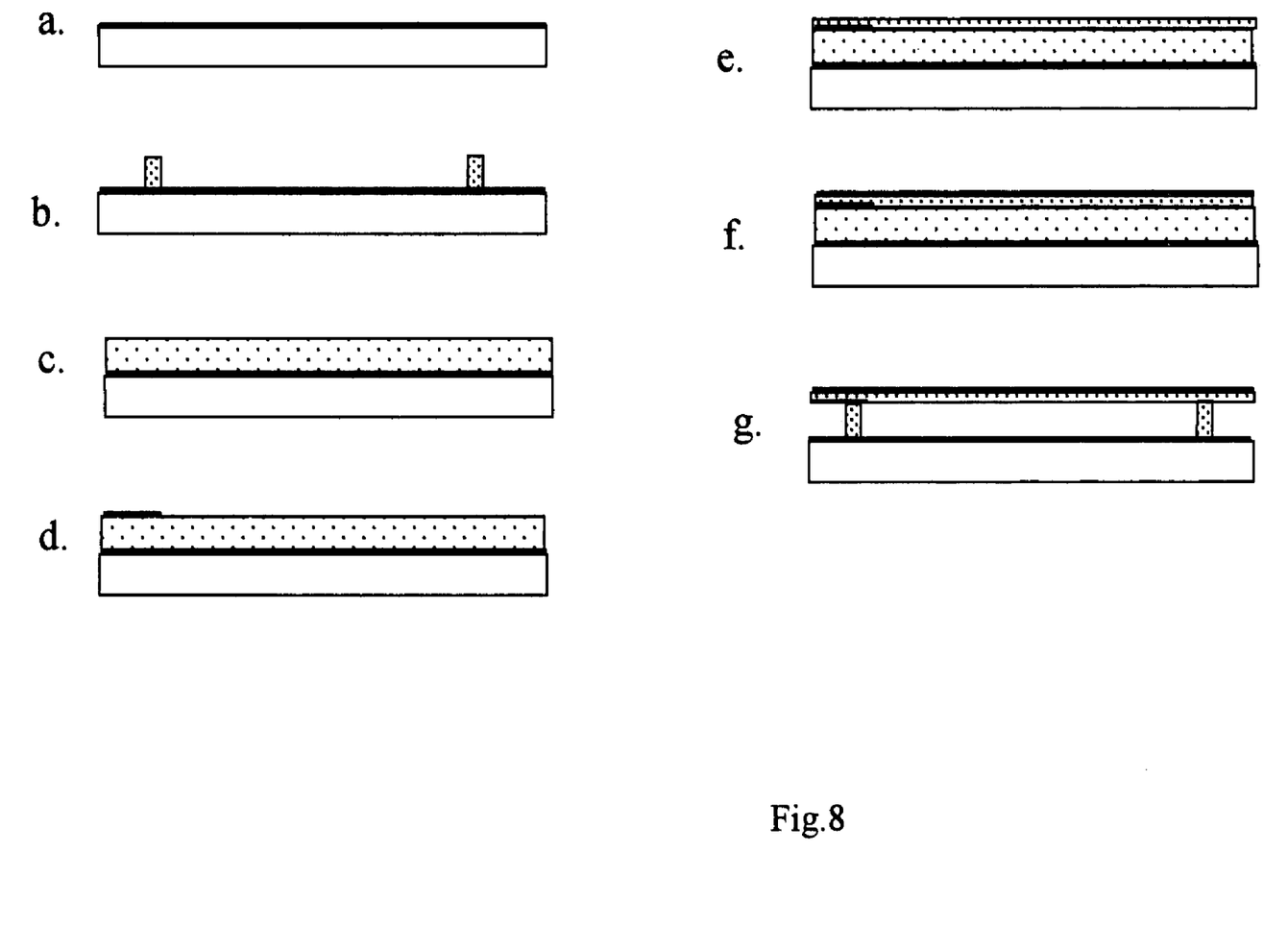
FIG. 8. Processing steps for display fabrication.

FIG. 8 shows key steps for the display fabrication. The first step is deposition of the metal layer on the substrate and photolithography patterning and etching to fabricate the active electrode structure, FIG. 8a. A thin layer of insulator is deposited on the substrate to insulate the metal structure from the active electrode on the membrane, when the membrane is moved to its upright position. Then, the pillars of 3–4 μm high are grown on the substrate. For this purpose, the first sacrificial layer, 3–4 μm-thick, is deposited, patterned and etched to form the pillars, FIG. 8b. Then, substrate blackening is performed if the reflection device mode is chosen. It is followed by deposition of a second sacrificial layer, such as polyimid, having thickness equal to the pillar height, FIG. 8c.

Electrochemical polishing is then needed to provide a flat surface for further processing. Fabrication of the membrane structure starts from deposition of the metal on the second sacrificial layer, photolithography patterning end metal etching to form the membrane active electrode, FIG. 8d. It is followed by deposition of the insulator layer, preferably, $SiO_2$, FIG. 8e, and deposition of the top reflective metal layer, preferably Al, if reflective mode display is considered, FIG. 8f. The alternative process would be deposition of a white paint, or a black powder, depending on the chosen mode of the display operation. It is followed by patterning and etching of both the top layer and $SiO_2$ film to form the pixel structure. Finally, the sacrificial layer is removed by plasma etching to provide an air gap between the membrane and the substrate, FIG. 8g. To avoid etching of the pillars by plasma etching, the first sacrificial layer must be resistive to the plasma etching process chosen for removal of the second sacrificial layer. All these processes are well within capabilities of modern, plane MEMS technology. Only four photolithography masks are needed for the device processing. This makes the device manufacturing simple and inexpensive.

In the above description, each pixel contains only one membrane activated by the electrostatic force. One can however realize another design wherein each pixel has two or more membranes. Every membrane covers half or one third of the pixel area if two or three membranes per pixel are respectively used. Each small membrane can be activated either separately or simultaneously with another membrane (or membranes) in the pixel, thereby providing a capability for gray levels. As in the previous, single membrane, design, two- or three-electrode structures for individual activation of the small

The invention claimed is:

1. A two-electrode optical electromechanical shutter comprising:
   a substrate;
   a membrane originally resting on four pillars above said substrate; said membrane being composed of the following elements:
   a first conducting electrode facing said substrate and attached to two pillars of said four pillars through torsion hinges made from the same material as said conducting electrode; said first conducting electrode is placed at the membrane edge in the shape of a stripe parallel to said membrane edge and has the width equal or less than the depth of the air gap existing between said substrate and said membrane, so that said membrane is capable of rotating around said torsion hinges and reaching position normal to the substrate plane;
   a layer of insulator above said conducting electrode;
   a top layer on said insulator.
   a second conducting electrode placed on said substrate underneath said first conducting electrode on said membrane and made as a stripe parallel to said first conducting electrode, so that under application of appropriate potential difference between said first and second conducting electrodes said membrane can move to the position normal to said substrate plane;
   output conductive lines connected to said first and second conductive electrodes for application of a voltage to the shutter.

2. The shutter of claim 1 wherein said torsion hinges are made within the membrane area by cutting notches through said membrane to form narrow and flexible belts extending to said two pillars of said four pillars.

3. The shutter of claim 1, wherein the resilient properties of said torsion hinges are properly adjusted to produce effect of shutter bi-stability, when the potential difference between said first and second conductive electrodes needed to rotate said membrane into its final position normal to the substrate plane is significantly larger than the potential difference between said first and second electrodes needed to maintain said membrane in said final position.

4. The shutter of claim 3, wherein said substrate is made from glass.

5. A display comprising a two-dimensional array of the shutters of claim 3 which form a matrix of pixels, wherein said first conductive electrodes of all shutters in every vertical array are connected to a column conductive line and said second conducive electrodes of all shutters in every horizontal array are connected to a row conductive line, so that every pixel in the display is associated with a particular pair of said column and row lines to selectively apply voltage to the pixel located at the intersection of these lines.

6. The display of claim 5, wherein the operation of the display activation to produce an image is followed by holding all pixels in the display at a constant voltage, which is lower than the voltage needed to transfer pixel into the "on"-state.

7. The display of claim 6, in which for reflecting mode of the display operation the substrate is blackened and absorbs light, while said top layer on said insulator is a white color powder to enhance the contrast ratio.

8. The display of claim 6, in which for reflecting mode of the display operation the substrate is blackened and absorbs light, while said top layer on said insulator is made as a light reflective metal to enhance the contrast ratio.

9. The display of claim 6, wherein for reflective mode of the display operation the substrate is coated with a white color film, while said top layer on said insulator is a black powder to absorb light and increase the contrast ratio.

10. The display of claim 6, wherein for transmissive mode of the display operation the substrate is made from a transparent material to pass light in the "on"-state, and said top layer on said insulator is a black powder, to absorb light and thus increase the contrast ratio.

11. The method of fabrication of the display of claim 6 comprising the following steps:
   providing the substrate;
   metal deposition, photolithography patterning and metal etching to form said second conductive electrode and said row lines;
   deposition of the first sacrificial layer, photolithography patterning and etching to fabricate said four pillars;
   deposition of the second sacrificial layer;
   electromechanical etching to produce flat top surface with thickness of said second sacrificial layer equal to height of said four pillars;
   metal deposition, photolithography patterning and etching to form said first conducting layer and said column lines;
   deposition of said layer of insulator;
   deposition of said top layer on said insulator;
   photolithography patterning and etching of said top layer on said insulator and said layer of insulator to form said membranes;
   plasma etching of said second sacrificial layer to form pixels.

12. A three-electrode electromechanical shutter comprising:
   a substrate;
   a membrane originally resting on four pillars above said substrate; said membrane being composed of the following elements:
      a first conducting electrode facing said substrate and attached to two pillars of said four pillars through torsion hinges made from the same material as said conducting electrode; said first conducting electrode consists of three conducting pieces:
         the first piece is placed at the membrane edge in the shape of a stripe parallel to said membrane edge and has the width equal or less than the width of the air gap existing between said substrate and said membrane, so that said membrane is capable of rotating around said torsion hinges and reaching position normal to the substrate plane;
         the second piece in the shape of a stripe of the same width as said first piece is placed in the middle of said membrane parallel to said first piece;
         the third piece in the shape of a stripe is placed normally to said first and second pieces and connects said first and second pieces into a single said first conducting electrode;
      a layer of insulator above said conducting electrode;
      a top layer on said insulator;
   a second conducting electrode placed on said substrate underneath said first piece of said first conductive electrode on said membrane and made as a stripe parallel to said first piece;
   a third conducting electrode placed on said substrate underneath and parallel to said second piece of said first conducting electrode;
   output conductive lines connected to said first, second and third conductive electrodes for application of voltages to the shutter.

13. The shutter of claim 12 wherein said torsion hinges are made within the membrane area by cutting notches through said membrane to form narrow and flexible belts extending to said two pillars of said four pillars.

14. The shutter of claim 12, wherein the resilient properties of said torsion hinges are properly adjusted to produce effect of shutter bi-stability, when the potential difference between said first and second conductive electrodes needed to rotate said membrane into its final position normal to the substrate plane is significantly larger than the potential difference between said first and second electrodes needed to maintain said membrane in said final position, while no potential difference is applied between said first and third conducting electrodes.

15. The shutter of claim 12, wherein said substrate is made from glass.

16. The shutter of claim 12, wherein said first and second conductive electrodes are made from metal.

17. The shutter of claim 12, in which for the reflecting mode of the shutter operation the substrate is blackened and absorbs light, while said top layer on said insulator is a white color powder or paint to enhance the contrast ratio.

18. The shutter of claim 12, in which for reflecting mode of the shutter operation substrate is blackened and absorbs light, while said top layer on said insulator is made as a light reflective metal to enhance the contrast ratio.

19. The shutter of claim 12, wherein for reflective mode of the display operation the substrate is coated with a white dielectric, while said top layer on said insulator is a black powder.

20. The shutter of claim 12, wherein for the transmissive mode of the shutter operation the substrate is made from a transparent glass to pass the light in the "on"-state, while said top layer on said insulator is a black powder.

21. A display comprising a two-dimensional array of the shutters of claim 13 which forms a matrix of pixels, wherein said first conductive electrodes of all shutters in every vertical array are connected to a column conductive line and said third conducive electrodes of all shutters in every horizontal array are connected to a row conductive line, while all said second conductive electrodes on said substrate are grounded.

22. The display of claim 21, wherein the operation of the display activation to produce an image on the screen is followed by holding all pixels in the display at a constant voltage, which is lower than the voltage needed to transfer pixel into the "on"-state.

23. The display of claim 22, in which for reflecting mode of the display operation the substrate is blackened and absorbs light, while said top layer on said insulator is a white color powder to enhance the contrast ratio.

24. The display of claim 22, in which for reflecting mode of the display operation the substrate is blackened and absorbs light, while said top layer on said insulator is made as a light reflective metal to enhance the contrast ratio.

25. The display of claim 23, wherein for reflective mode of the display operation the substrate is coated with a white dielectric, while said top layer on said insulator is a black powder to absorb light and increase the contrast ratio.

26. The display of claim 23, wherein for transmissive mode of the display operation the substrate is made from a transparent glass to pass light in the "on"-state, while said top layer on said insulator is a black powder, to absorb light and thus increase the contrast ratio.

* * * * *